US008061683B2

(12) United States Patent
Long

(10) Patent No.: US 8,061,683 B2
(45) Date of Patent: Nov. 22, 2011

(54) MANUAL VALVE OPERATORS HAVING A LOCKOUT DEVICE

(75) Inventor: Ross E. Long, State Center, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 298 days.

(21) Appl. No.: 12/414,063

(22) Filed: Mar. 30, 2009

(65) Prior Publication Data

US 2010/0243930 A1    Sep. 30, 2010

(51) Int. Cl.
     *F16K 35/00*      (2006.01)
(52) U.S. Cl. ............. 251/105; 251/101; 251/90; 70/177
(58) Field of Classification Search ........ 251/90, 251/95, 98, 101, 104, 105, 107, 109; 70/175, 70/176, 177, 180
See application file for complete search history.

(56) References Cited

U.S. PATENT DOCUMENTS

| | | | | |
|---|---|---|---|---|
| 3,341,170 | A | * | 9/1967 | Housworth .................. 251/306 |
| 3,904,173 | A | | 9/1975 | Naylor |
| 5,003,797 | A | | 4/1991 | Wirth et al. |
| 5,165,263 | A | * | 11/1992 | Perron et al. .................. 70/177 |
| 5,222,382 | A | * | 6/1993 | De Vizzi ........................ 70/212 |
| 5,299,597 | A | * | 4/1994 | Fort et al. ...................... 137/385 |
| 5,415,017 | A | | 5/1995 | Benda et al. |
| 5,598,724 | A | | 2/1997 | Primeau |
| 6,959,909 | B2 | * | 11/2005 | Bancroft et al. ............. 251/109 |
| 2007/0063157 | A1 | | 3/2007 | Miklo et al. |

FOREIGN PATENT DOCUMENTS

| | | |
|---|---|---|
| EP | 1780455 | 5/2007 |
| JP | 02074683 | 3/1990 |

OTHER PUBLICATIONS

Metso Automation, "Wafer-Sphere High Performance Butterfly Valves," Installation, Maintenance, and Operating Instructions, issued Feb. 2004, 12 pages.
International Searching Authority, "International Search Report," issued in connection with international application serial No. PCT/US2010/025434, mailed May 19, 2010, 4 pages.
International Searching Authority, "Written Opinion of the International Searching Authority," issued in connection with international application serial No. PCT/US2010/025434, mailed May 19, 2010, 5 pages.

* cited by examiner

*Primary Examiner* — John Fristoe, Jr.
(74) *Attorney, Agent, or Firm* — Hanley, Flight & Zimmerman, LLC

(57) ABSTRACT

Manual valve operators having a locking device are described. An example manual operator includes a lever rotatably coupled to a locking plate and has a handle that pivots between a first position to prevent rotation of the lever relative to the locking plate and a second position to enable rotation of the lever relative to the locking plate. A lockout member is removably coupled to the handle. The handle has an aperture to receive at least a portion of the lockout member. The lockout member engages a portion of the lever to prevent the handle from pivoting between the first and second positions to prevent rotation of the lever relative to the locking plate when the lockout member is coupled to the handle.

19 Claims, 6 Drawing Sheets

MANUAL VALVE OPERATORS HAVING A LOCKOUT DEVICE

FIELD OF THE DISCLOSURE

The present disclosure relates generally to valves and, more particularly, to manual valve operators having a lockout device.

BACKGROUND

Fluid process systems typically use valves such as, for example, rotary valves to control the flow of process fluids. Rotary valves typically include a flow control member disposed in a fluid path and rotatably coupled to a body of the rotary valve via a shaft. A portion of the shaft extending from the rotary valve is operatively coupled to an actuator (e.g., a manual actuator or operator, etc.), which operates the flow control member. For example, a manual actuator or operator includes a lever or lever arm to couple the manual actuator or operator to a valve shaft. The lever may be rotated between a first position and a second position to move the flow control member (e.g., a disk, a ball, etc.) of the valve to a desired angular position to achieve a desired fluid flow through the rotary valve.

Some regulatory organizations (e.g., the Occupational Safety and Health Administration (OSHA)) have established safety or lockout procedures to prevent unintentional or unauthorized operation of equipment used for processing, for example, hazardous fluids. Typically, such standards require a valve to be locked in a closed position (e.g., temporarily rendered inoperative) via, for example, a safety or lockout device to prevent unintentional or unauthorized actuation of the valve actuator (e.g., a lever of a manual actuator). The safety or lockout devices are to prevent operation of the valve until the lockout device is removed. For example, lockout or safety devices are often used to ensure that a lever of a manual operator will not actuate during maintenance or repair of the valve. Such lockout or safety devices prevent unauthorized or unintentional rotation of the lever and, thus, prevent unauthorized or unintentional rotation of the flow control member of a valve.

Some known rotary valves include lockout devices integrally formed with the valve. However, such integrally formed lockout devices often involve a complex arrangement of components to achieve a lockout condition. Some other known rotary valves are implemented with lockout devices that involve additional components that are to be coupled to a lever of a rotary valve. For example, one known lockout device includes a housing to engage a lever and a sleeve that is slidably coupled to the housing. The sleeve includes a plurality of apertures to align with corresponding apertures of the housing so that a locking device may be removably coupled to the sleeve and the housing via the apertures to prevent removal of the housing and the sleeve from the lever. However, such known valves having integrated lockout devices and/or known lockout devices having additional components require additional manufacturing, more complex valve assemblies, and increased manufacturing costs.

SUMMARY

In one example, a manual operator for use with a valve includes a lever rotatably coupled to a locking plate and having a handle that pivots between a first position to prevent rotation of the lever relative to the locking plate and a second position to enable rotation of the lever relative to the locking plate. A lockout member is removably coupled to the handle. The handle has an aperture to receive at least a portion of the lockout member. The lockout member engages a portion of the lever to prevent the handle from pivoting between the first and second positions to prevent rotation of the lever relative to the locking plate when the lockout member is coupled to the handle.

In another example, a rotary valve includes a valve body having a closure member movable between a first position to prevent fluid flow through the valve body and a second position to allow fluid flow through the valve body, in which a first end of a valve shaft is coupled to the closure member. A locking plate is coupled to the valve body and has a plurality of notches between a third position corresponding to the first position of the closure member and a fourth position corresponding to the second position of the closure member. The locking plate has an aperture to receive a second end of a valve shaft. A lever is coupled to the second end of the valve stem and rotatably coupled relative to the locking plate to move the closure member between the first position and the second position. The lever has a handle pivotally coupled to the lever to enable the lever to rotate relative to the locking plate when the handle is pivoted relative to the lever. A lockout member is removably coupled to the handle that has an aperture therethrough to receive a portion of the lockout member. The lockout member is to prevent the handle from pivoting relative to the lever to prevent rotation of the lever relative to the locking plate.

In yet another example, a manual actuator for use with a valve includes means for operatively coupling the manual actuator to the valve. The manual actuator has a lever rotatably coupled relative to a locking plate and a handle pivotally coupled to the lever. The handle pivots between a first position to enable rotation of the lever relative to the locking plate and a second position to maintain a position of the valve corresponding to the position of the lever relative to the locking plate. The manual operator also includes means for locking out the manual actuator such that a portion of the means for locking out is to engage a portion of the lever to prevent the handle from pivoting between the first and second positions. The handle has an aperture to receive at least a portion of the means for locking out.

DETAILED DESCRIPTION

Fluid control devices such as, for example, rotary valves, are commonly distributed throughout process control systems to control fluid flow rates of various fluids (e.g., liquids, gases, etc.). Manually actuated valves are generally less expensive than automatically controlled valves (i.e., control valves) and are typically used where automatic control is not available or desired. Additionally, some standards (e.g., standards established by the Occupational Safety and Health Administration (OSHA)) often call for manual valves to be in a lockout condition when used, for example, with hazardous fluids to prevent unintentional or unauthorized operation of the valve during maintenance or repair of the valve.

In general, the example manual valve actuators or operators described herein provide a lockout condition to prevent unauthorized or unintentional actuation of the manual operator (e.g., per OSHA standards). The example manual valve actuators or operators described herein provide a simplified configuration to reduce valve components and parts and, thus, manufacturing costs. The example manual operators described herein typically include a lever or lever arm operatively coupled to a flow control member of a valve via a valve shaft. An end of the manual operator is typically coupled to an end of the valve shaft so that rotation of the lever relative to a body of the valve and a locking plate in a first direction causes the flow control member to move toward a sealing surface (e.g., a seat ring) to prevent fluid flow through the valve and rotation of the lever in a second direction opposite the first direction causes the flow control member to move away from the sealing surface to allow fluid flow through the valve. The lever includes a handle that pivots between a first position relative to the lever to prevent rotation of the lever relative to the valve body and a second position relative to the lever to enable rotation of the lever relative to the valve body and the locking plate.

To provide a lockout condition, the handle of an example manual operator described herein includes an aperture to receive at least a portion of a lockout member. The lockout member engages a portion of the lever to prevent the handle from pivoting between the first and second positions to prevent the rotation of the lever when the lockout member is coupled to the handle. Thus, the example manual operators described herein include a safety or lockout member to provide a lockout condition to prevent unauthorized or unintentional actuation of the lever of the manual operators.

Figure 1A:
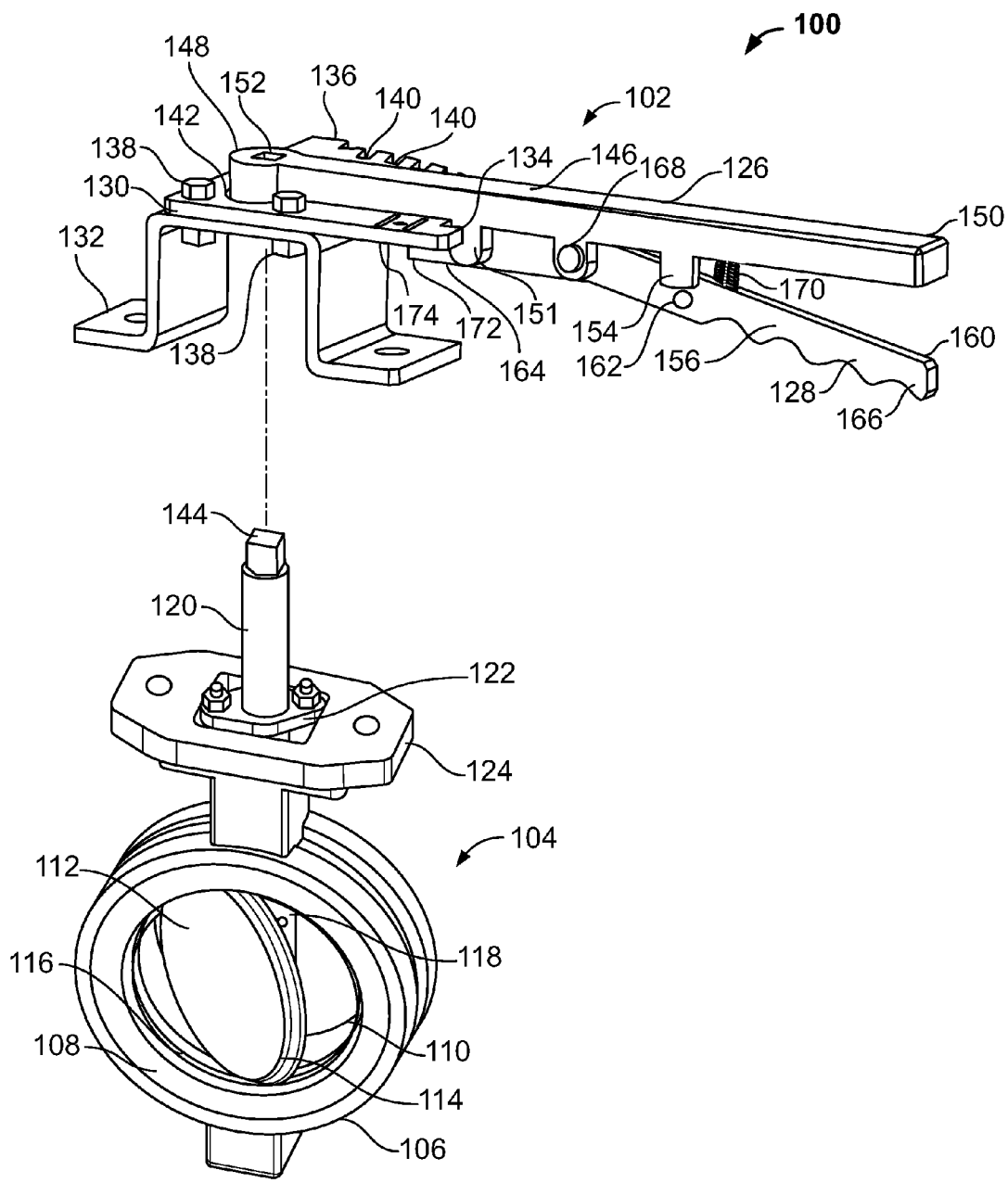
FIG. 1A illustrates an exploded view of an example valve implemented with an example manual operator described herein.
Figure 1B:
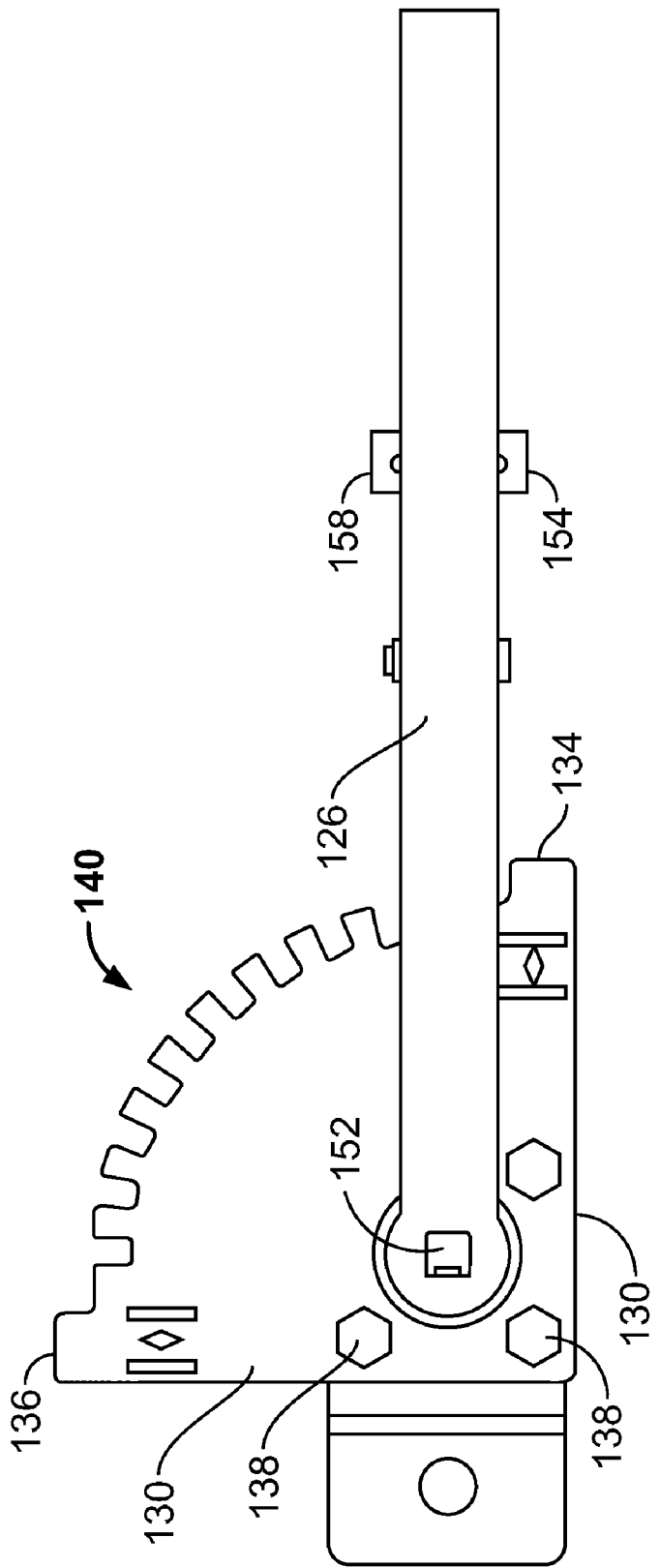
FIG. 1B illustrates a plan view of the example manual operator of FIG. 1A.

FIG. 1A illustrates an exploded view of an example valve assembly 100 implemented with an example manual actuator or operator 102 described herein. FIG. 1B is a plan view of the example manual operator 102 shown in FIG. 1A.

Referring to FIGS. 1A and 1B, the valve assembly 100 includes a rotary valve 104 having a body 106 that defines a fluid flow passageway between an inlet 108 and an outlet 110. The inlet 108 couples the rotary valve 104 to an upstream fluid source and the outlet 110 couples the rotary valve 104 to downstream fluid conveyances or consumption devices. A flow control member 112 (e.g., a disk, a ball, etc.) is disposed within the fluid flow passageway. In this example, the flow control member 112 is illustrated as a disk having a peripheral edge 114 that sealingly engages a valve seat or annular sealing surface 116 (e.g., a seal ring) to prevent fluid flow through the valve body 106 and moves away from the sealing surface 116 to enable fluid flow through the valve body 106. Thus, the rate of fluid flow through the rotary valve 104 is controlled by the position of the flow control member 112 relative to the sealing surface 116. The flow control member 112 is operatively coupled to a first end 118 of a valve shaft 120 and a follower shaft (not shown) via, for example, pins, fasteners, etc. However, in other examples, the valve 104 may be a ball valve, an eccentric disk valve, or any other suitable valve.

The rotary valve 104 may include a packing 122 that is disposed coaxially with the valve shaft 120 and at least partially disposed within the valve body 106 to prevent unwanted leakage along the valve shaft 120 and into the environment. The valve body 106 includes a flange 124 to couple the valve body 106 to the example manual operator 102.

Figure 3:
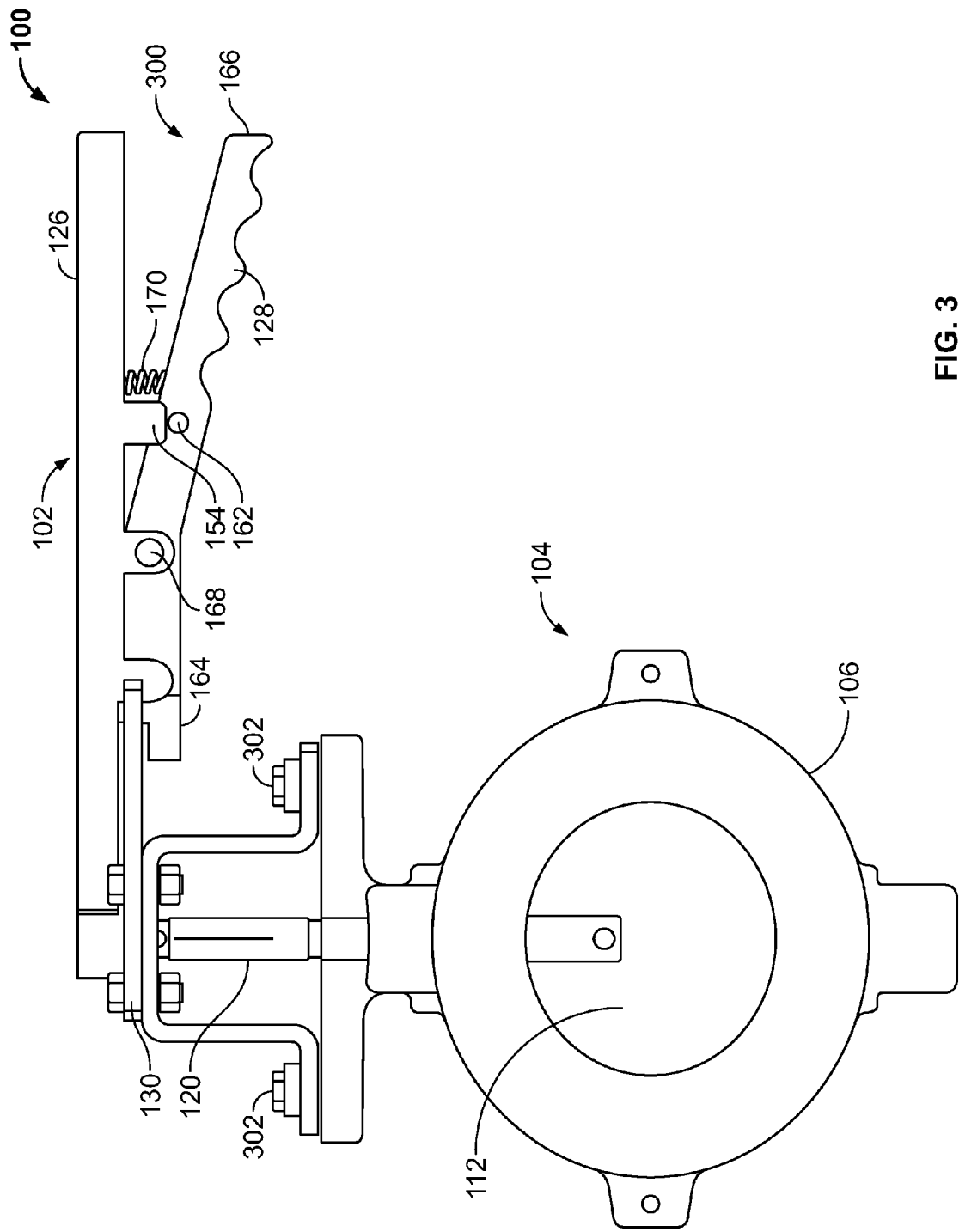
FIG. 3 is a side view of the example valve of FIG. 1A showing a handle of the example manual operator in an engaged position.

The example manual operator 102 includes a lever or lever arm 126, a handle 128, and a locking plate 130 (e.g., a notched quadrant plate). In this example, a mounting bracket 132 mounts or couples the manual operator 102 to the flange 124 of the valve body 106 via fasteners 302 (FIG. 3). The lever 126 is rotatably coupled to the locking plate 130 and rotates between a first position 134 and a second position 136 relative to the locking plate 130 to vary the position of the flow control member 112 of the rotary valve 104 between a first position (e.g., a fully open or maximum flow rate position) to allow fluid flow through the rotary valve 104 and a second position (e.g., a closed position) to prevent fluid flow through the rotary valve 104.

The locking plate 130 is coupled to the mounting bracket 132 via fasteners 138 and has at least a first notch corresponding to the first position 134 of the lever 126 relative to the locking plate 130 and a second notch corresponding to the second position 136 of the lever 126 relative to the locking plate 130. As most clearly shown in FIG. 1B, in this example, the locking plate 130 includes a plurality of notches 140 between the first and second positions 134 and 136 that correspond to respective throttling positions of the flow control member 112. The locking plate 130 includes an aperture 142 to receive a second end 144 of the valve shaft 120.

The lever 126 is coupled to the flow control member 112 via the second end 144 of the valve shaft 120 and is rotatably coupled to the locking plate 130 to operate the flow control member 112 of the rotary valve 104. The lever 126 includes an elongated body 146 having a first end 148 and a second end 150. The first end 148 of the lever 126 includes an aperture 152 to receive the second end 144 of the valve shaft 120. The aperture 152 of the lever 126 has a shape complementary to the shape of the second end 144 of the valve shaft 120. As shown, the second end 144 of the valve shaft 120 is a square end stub shaft. However, in other examples, the second end 144 of the valve shaft 120 may be a double D stub shaft end, a keyed stub shaft end, a rectangular shaft end, a splined shaft end, or any other suitable shaft end.

Although not shown, in one example, the second end 144 of the valve shaft 120 may include a bore or aperture to couple the lever 126 to the second end 144 of the valve shaft 120 via, for example, a fastener. However, in other examples, the first end 148 of the lever 126 may include any other suitably shaped end to couple lever 126 to the second end 144 of the valve shaft 120 without the need to machine a bore or aperture through the second end 144 of the valve shaft 120 such as, for example, locking screws, an interference fit, pins, or any other suitable fastening mechanism(s).

In this example, the lever 126 includes a support member 151 to guide and maintain the lever 126 substantially parallel to the handle 128 when the handle 128 is engaged with the locking plate 130 (e.g., with one of the notches 140). The support member 151 provides support to prevent movement between the lever 126 relative to the handle 128 when the handle 128 is engaged with the locking plate 130.

Additionally, the lever 126 includes a first protruding member or tab 154 adjacent a first side surface 156 of the handle 128 and a second protruding member or tab 158 adjacent a second side surface 160 of the handle 128. The first and second tabs 154 and 158 protrude from the lever 126 adjacent the respective first and second side surfaces 156 and 160 of the handle 128 proximate to an aperture 162 of the handle 128.

The handle 128 is pivotally coupled to the lever 126 between a first end 164 of the handle 128 and a second end 166 of the handle 128 about a pivot point 168 and between the first and second tabs 154 and 158. The handle 128 pivots relative to the lever 126 between a first position (e.g., an engagement or locked position) and a second position (e.g., an operative position). The first end 164 of the handle 128 includes an engaging surface or edge 402 (FIG. 4) that engages (e.g., is disposed within) one of the plurality of notches 140. In this example, a biasing element 170 (e.g., a spring) biases the second end 166 of the handle 128 to the first position so that the biasing element 170 biases the first end 164 of the handle 128 in any one of the plurality of notches 140. The biasing element 170 provides a spring loading to bias the first end 164 of the handle 128 within a selected notch of the plurality of notches 140 to secure or lock the position of the lever 126 and, thus, the position of the flow control member 112, at any position corresponding to any one of the plurality of notches 140. Thus, the lever 126 may be positioned to engage any one of the plurality of notches 140 to lock the position of the flow control member 112 between the first position (e.g., the closed position) and the second position (e.g., the open position) for on/off applications or any intermediate positions for throttling control.

Additionally, in this example, the first end 164 of the handle 128 includes a protruding member or safety tab 172 to engage a surface 174 (e.g., a bottom surface) of the locking plate 130 and/or the notches 140 via interference (e.g., frictional interference) when the second end 166 of the handle 128 is biased away from the lever 126 via the biasing element 170 (i.e., in a locked position). In other examples, a surface of the safety tab 172, and/or a surface of the plate 130 may include a rubber coating, a rubber pad, etc., disposed thereon, and/or may be roughened, jagged, etc., to provide additional friction between the safety tab 172 and the plate 130. In yet other examples, the handle 128 does not include the safety tab 172. For example, the safety tab 172 prevents the lever 126 from dislodging from the valve shaft 120 due to, for example, vibration when the lever 126 is coupled to the valve shaft 120 via, for example, a frictional fit.

The handle 128 includes the aperture 162 along a portion of the handle 128 to receive at least a portion of a lockout member or device to provide a valve lockout condition. The aperture 162 may be formed in the handle 128 via, for example, machining (e.g., drilling) or any other suitable process(es).

Figure 2:
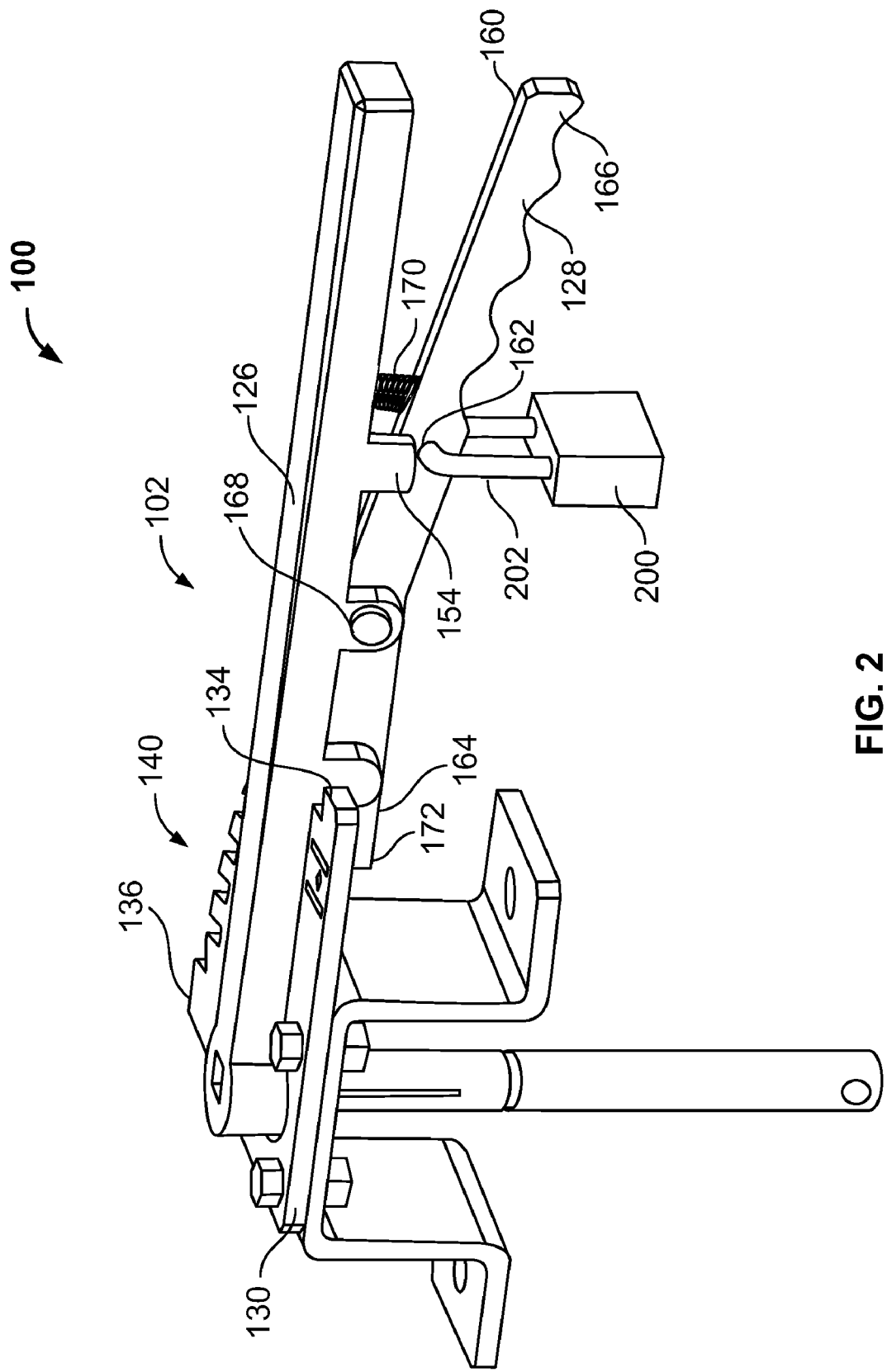
FIG. 2 is another view of the example manual operator of FIGS. 1A and 1B.

FIG. 2 illustrates a perspective view of the manual operator 102 of FIGS. 1A and 1B that is implemented with an example lockout member 200 to provide a lockout condition. Although the handle 128 and the lever 126 retain the position of the rotary valve 104 when the first end 164 of the handle 128 engages one of the plurality of notches 140, in some instances, it may be necessary (e.g., per OSHA standards) or desired to lockout the manual operator 102 to prevent unintentional or undesired rotation of the lever 126 relative to the locking plate 130. For example, such a lockout condition may be required during maintenance or service of the rotary valve 104. The example lockout member 200 prevents unintentional or unauthorized rotation of the lever 126 relative to the locking plate 130 when coupled to the manual operator 102.

The example lockout member 200 is removably coupled to the handle 128 via the aperture 162. The aperture 162 receives at least a portion of the lockout member 200. The lockout member 200 engages at least a portion of the lever 126 to prevent the handle 128 from pivoting between the first and second positions to prevent rotation of the lever 126 relative to the locking plate 130 when the lockout member 200 is coupled to the handle 128. More specifically, the lockout member 200 engages the first tab 154 and/or the second tab 158 (FIG. 1B) of the lever 126 adjacent the first and second side surfaces 156 and 160 (FIG. 1B) of the handle 128.

As shown in FIG. 2, the lockout member 200 is depicted as a padlock. A shackle portion 202 of the padlock is coupled to the handle 128 via the aperture 162 (e.g., the shackle portion 202 is inserted within the aperture 162). When coupled to the handle 128, the shackle portion 202 of the padlock engages (e.g., interferes with) the first or second tabs 154 and 158 (FIG. 1B) of the lever 126 to prevent the second end 166 of the handle 128 from pivoting to the second position (e.g., toward the lever 126). Thus, when coupled to the handle 128, the locking member 200 prevents rotation of the lever 126 relative to the locking plate 130 and, thus, prevents unintentional movement of the flow control member 112. The lockout member 200 is removed or decoupled from the handle 128 to enable operation of the valve 104.

Figure 4:
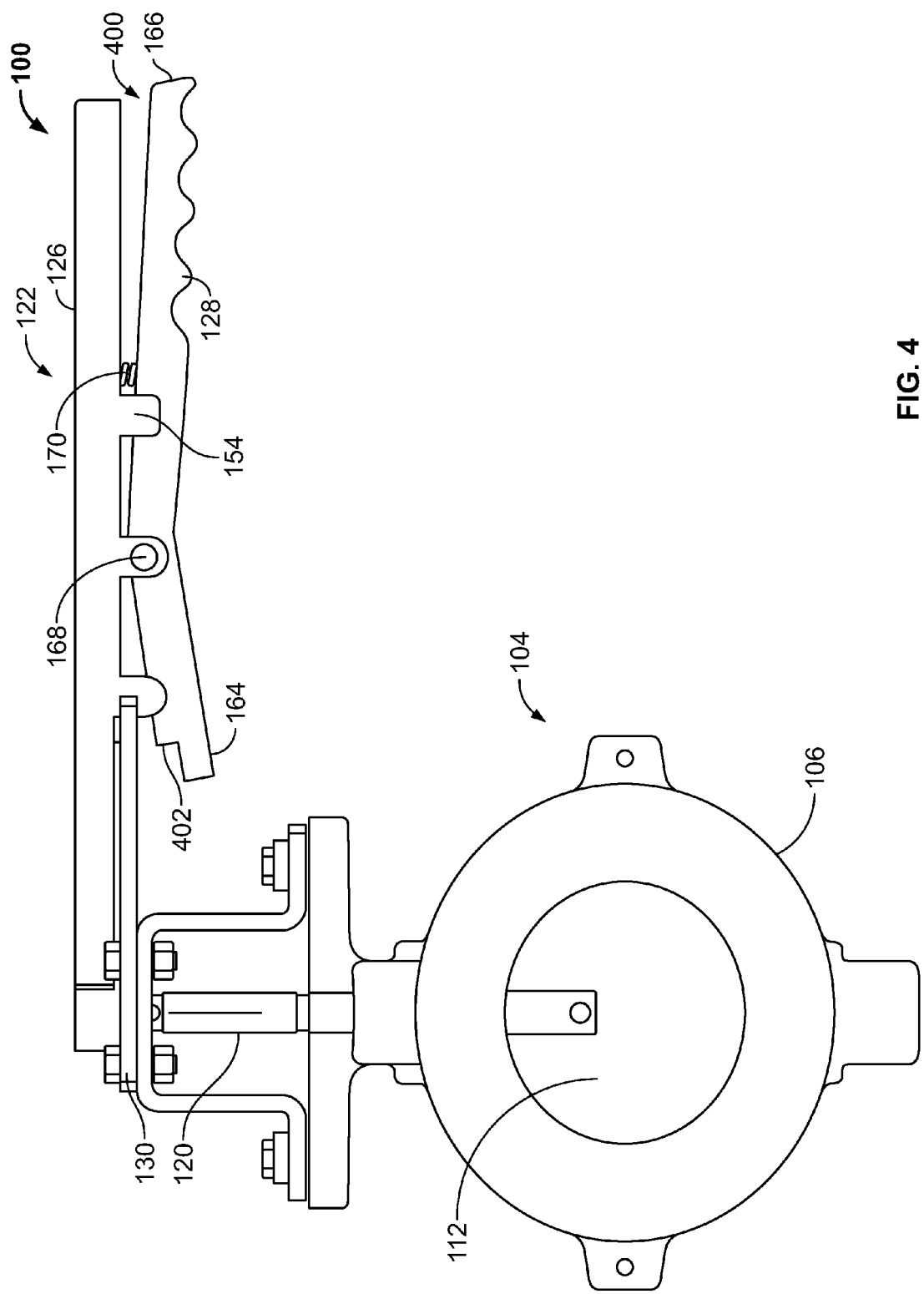
FIG. 4 is a side view of the example valve of FIGS. 1A and 3 showing the handle of the example manual operator in an operative position.
Figure 5:
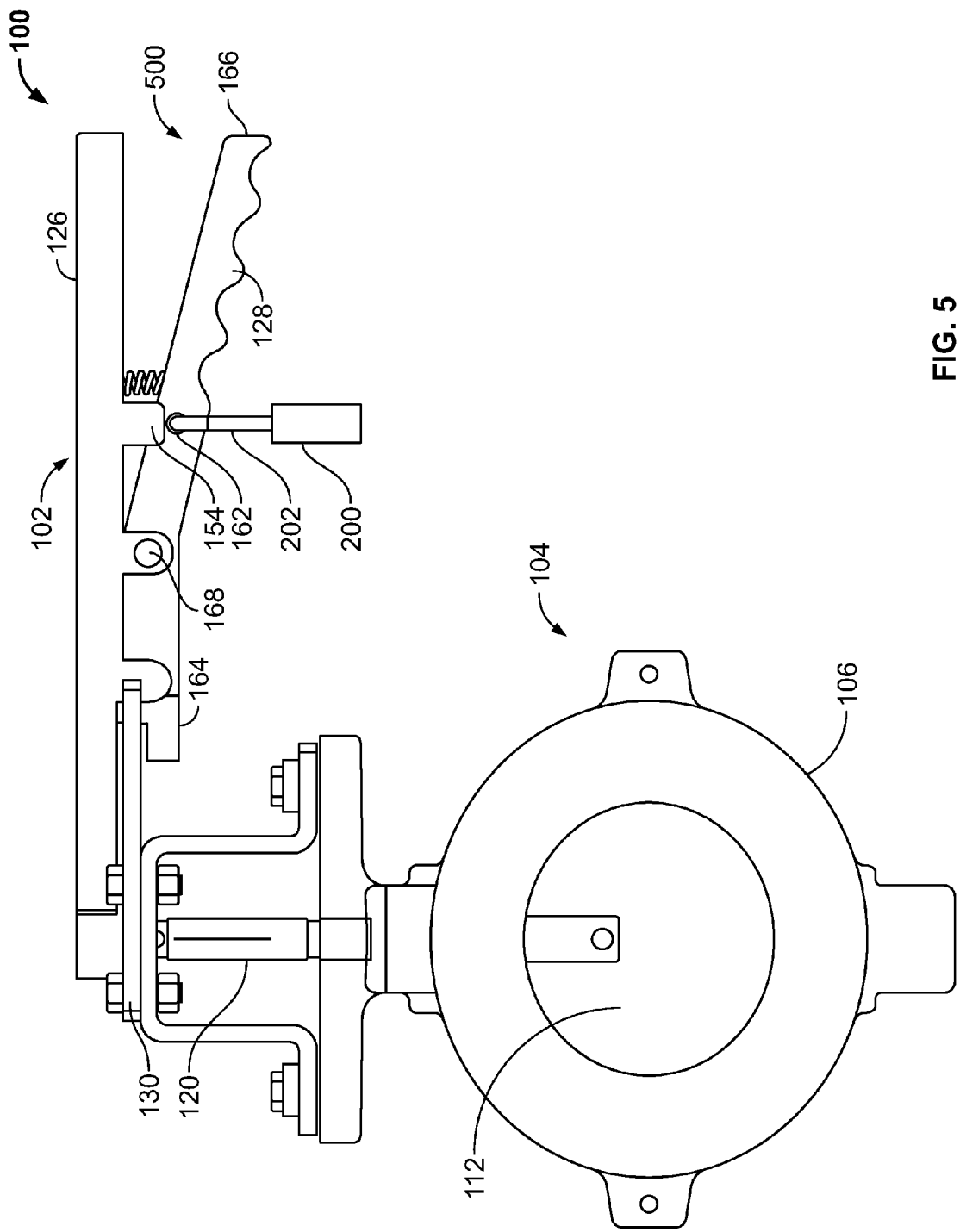
FIG. 5 is a side view of the example valve assembly of FIGS. 1A, 3, and 4 showing the example manual operator in a lockout condition.

FIG. 3 illustrates a side view of the example valve assembly 100 of FIGS. 1A and 1B illustrating the handle 128 in the first or engagement position 300 (e.g., the second end 166 is pivoted away from the lever 126). FIG. 4 illustrates a side view of the example valve assembly 100 of FIGS. 1A and 1B showing the handle 128 in the second or operative position 400 (e.g., the second end 166 is pivoted toward the lever 126). FIG. 5 illustrates the example valve assembly 100 of FIGS. 1A and 1B in a lockout condition 500.

In operation, referring to FIGS. 3-5, when the handle 128 is in the first or engagement position 300, the biasing element 170 biases the second end 166 of the handle 128 away from the lever 126 about the pivot point 168 so that the first end 164 of the handle 128 engages one of the notches 140. When the second end 166 of the handle 128 is at the first position (e.g., moved away from the lever 126), the first end 164 engages (e.g., is disposed within) the one of the plurality of notches 140 formed in the locking plate 130 to retain or secure the position of the lever 126, and thus, the position of the flow control member 112 of the rotary valve 104 at a position corresponding to one of the notches 140. Thus, the lever 126 and/or the handle 128 retain the position of the flow control member 112 between the first position (e.g., the closed position) and the second position (e.g., the open position) corresponding to the first position 134 and the second position 136 for on/off applications or any intermediate positions therebetween corresponding to other ones of the notches 140 to throttle the fluid through the valve 104.

Referring to FIG. 4, the second end 166 of the handle 128 is pivoted relative to the lever 126 from the first position 300 (shown in FIG. 3) to the second position 400 (shown in FIG. 4) to enable rotation of the lever 126 relative to the locking plate 130. The handle 128 pivots between the first and second tabs 154 and 158 as it pivots to the second position 400. Rotation of the lever 126 relative to the locking plate 130 in a first direction causes the flow control member 112 to move to the first position and rotation of the lever 126 relative to the locking plate 130 in a second direction causes the flow control member 112 to move to the second position. An operator or maintenance person manually moves the second end 166 of the handle 128 toward the lever 126 to compress the biasing element 170. Moving the second end 166 of the handle 128 toward the lever 126 causes the handle 128 to pivot about the pivot point 168 so that the first end 164 of the handle 128 disengages or moves away (e.g., in a downward direction in the orientation of FIG. 4) from the respective one of the plurality of notches 140.

When the lever 128 is in the position shown in FIG. 4, the operator can selectively position the flow control member 112 via the lever 126 to any desired intermediate position corresponding to any one of the plurality of notches 140. At the desired position, the operator releases the second end 166 of the handle 128, which causes the first end 164 of the handle 128 to pivot into engagement with one of the notches 140 as the lever 128 returns to the position 300 of FIG. 3. The biasing element 170 provides a spring loading to bias the first end 164 of the lever 126 to engage one of the plurality of notches 140, which allows the flow control member 112 to be locked in a position corresponding to one of the plurality of notches 140.

Referring to FIG. 5, to prevent pivotal movement of the handle 128 relative to the lever 126 to prevent rotation of the lever 126 relative to the locking plate 130, the locking member 200 is coupled to the handle 128 via the aperture 162. More specifically, when a person grasps the second end 166 of the handle 128 and attempts to pivot the handle to the second position 400 (e.g., toward the lever 126), the shackle portion 202 of the padlock engages (e.g., via interference) the first and second tabs 154 and 158 of the lever 126 to prevent pivotal movement of the handle 128 relative to the lever 126 to the second position 400.

The example manual actuator or operators 102 described herein provide a simplified method to lockout manually operated rotary valves. In particular, the example manual actuators or operators described herein 102 do not require additional parts or components to lockout rotary valves, thereby substantially reducing part complexity and costs.

Although certain example apparatus, methods, and articles of manufacture have been described herein, the scope of coverage of this patent is not limited thereto. On the contrary, this patent covers all apparatus, methods, and articles of manufacture fairly falling within the scope of the appended claims either literally or under the doctrine of equivalents.

What is claimed is:

1. A manual operator for use with a valve, comprising:
   a lever rotatably coupled to a locking plate and having a handle that pivots between a first position to prevent rotation of the lever relative to the locking plate and a second position to enable rotation of the lever relative to the locking plate, the handle having an aperture disposed between a pivot axis of the handle and a biasing element, wherein the biasing element is disposed between the handle and the lever to bias the handle toward the first position;
   a first tab protruding from the lever and toward the aperture of the handle, the first tab being substantially aligned with the aperture to expose the aperture when the handle is in the first position and to obstruct the aperture when the handle is in the second position; and
   a lockout member removably coupled to the handle the aperture of the handle to receive at least a portion of the lockout member such that the lockout member is to engage the first tab of the lever to prevent the handle from pivoting relative to the lever between the first and second positions to prevent rotation of the lever relative to the locking plate when the lockout member is coupled to the aperture of the handle.

2. An apparatus as described in claim 1, wherein the locking plate is coupled to a valve body of the valve and the lever is operatively coupled to a flow control member of the valve, wherein the lever is to rotate relative to the locking plate to move the flow control member between a first position and a second position.

3. An apparatus as described in claim 2, wherein the locking plate includes a first notch corresponding to the first position of the flow control member and a second notch corresponding to the second position of the flow control member.

4. An apparatus as described in claim 3, wherein at the first position of the handle, a first end of the handle is biased away from the lever so that a second end of the handle selectively engages the first notch or the second notch to retain the valve in the respective first or second position of the handle, and wherein at the second position, the first end of the handle is pivoted toward the lever so that the second end of the handle moves away from the first or second notch to enable rotation of the lever relative to the locking plate.

5. An apparatus as described in claim 4, wherein a first end of the handle includes a notch engaging surface to engage a notch of the locking plate and a safety tab adjacent the notch engaging surface, wherein the safety tab is substantially perpendicular relative to the notch engaging surface.

6. An apparatus as defined in claim 5, wherein the safety tab is to engage a surface of the locking plate and the notch engaging surface is to engage a notch of the locking plate when the second end of the handle is biased away from the lever.

7. An apparatus as described in claim 1, wherein the lockout member engages the first tab to prevent the handle from pivoting relative to the lever when the lockout member is coupled to the handle.

8. An apparatus as described in claim 7, wherein the lever includes a second tab opposite the first tab and adjacent a second side surface of the handle, wherein the lockout member engages the second tab to prevent the handle from pivoting relative to the lever when the lockout member is coupled to the handle.

9. An apparatus as described in claim 1, wherein the lockout member comprises a padlock.

10. An apparatus as described in claim 9, wherein at least a portion of a shackle of the padlock is disposed within the aperture of the handle so that the shackle of the padlock engages the first tab of the lever to prevent rotation of the lever relative to the locking plate.

11. A rotary valve comprising:
    a valve body having a closure member movable between a first position to prevent fluid flow through the valve body and a second position to allow fluid flow through the valve body, wherein a first end of a valve shaft is coupled to the closure member;
    a locking plate coupled to the valve body and having a plurality of notches between a third position corresponding to the first position of the closure member and a fourth position corresponding to the second position of the closure member, the locking plate having an aperture to receive a second end of a valve shaft;
    a lever coupled to the second end of the valve stem and rotatably coupled relative to the locking plate to move the closure member between the first position and the second position;
    a handle pivotally coupled to the lever to enable the lever to rotate relative to the locking plate when the handle is pivoted relative to the lever, the handle having an engagement member at a first end of the handle and a safety tab protruding from the engagement member, a first tab protruding from the lever and toward an aperture of the handle, the first tab being substantially aligned with the aperture to expose the aperture when the handle is in the first position and to obstruct the aperture when the handle is in the second position; and
    a lockout member removably coupled to the handle, the handle having the aperture therethrough adjacent a pivot axis of the handle to receive a portion of the lockout member, the aperture having an axis that is non-parallel to a rotational axis of the lever, and wherein the lockout member is to prevent the handle from pivoting relative to the lever to prevent rotation of the lever relative to the locking plate.

12. A valve as described in claim 11, wherein the engagement member is to selectively engage one of the plurality of notches to retain the position of the valve corresponding to the one of the plurality of notches between the third position and the fourth position when a second end of the handle is positioned away from the lever.

13. A valve as described in claim 12, wherein the engagement member at the first end of the handle disengages from the one of the plurality of notches to enable rotation of the lever between the third position and the fourth position when the second end of the handle is positioned toward the lever.

14. A valve as described in claim 13, wherein the safety tab is to engage a surface of the locking plate when the engagement member is in engagement with one of the plurality of notches, and wherein the safety tab moves away from the surface of the locking plate when the engaging member disengages from the one of the plurality of notches.

15. A valve as described in claim 11, wherein the lockout member comprises a padlock, and wherein the aperture of the handle is to receive a shackle portion of the padlock.

16. A valve as described in claim 11, wherein the lever includes a first tab and a second tab opposite the first tab, the first and second tabs protruding from the lever adjacent respective first and second sides of the handle proximate to the aperture of the handle.

17. A valve as described in claim 16, wherein at least a portion of the shackle engages the first and second tabs to prevent the handle from pivoting relative to the lever to prevent rotation of the lever relative to the locking plate.

18. A manual operator for use with a valve, comprising
means for operatively coupling the manual actuator to the valve, the means for operatively coupling the manual actuator to the valve being rotatably coupled relative to a locking plate and having means for engaging the locking plate, the means for engaging being pivotally coupled relative to the means for operatively coupling and to pivot between a first position to enable rotation of the means for operatively coupling relative to the locking plate and a second position to maintain a position of the valve corresponding to the position of the means for operatively coupling relative to the locking plate; and
means for locking out the manual actuator such that a portion of the means for locking out is to engage a portion of the means for operatively coupling to prevent the means for engaging from pivoting between the first and second positions, the means for engaging having an aperture to receive at least a portion of the means for locking out, wherein the means for operatively coupling is to expose the aperture when the means for engaging is in the first position and the means for operatively coupling is to obstruct the aperture when the means for engaging is in the second position.

19. A manual operator as defined in claim 18, wherein the means for engaging comprises first means for engaging a notch of the locking plate and second means for engaging a surface of the locking plate adjacent the notch when the means for engaging is in the second position.

* * * * *